(12) United States Patent
Kitamura et al.

(10) Patent No.: US 8,987,927 B2
(45) Date of Patent: Mar. 24, 2015

(54) CONSTRUCTION MACHINE

(71) Applicants: Kobe Steel, Ltd., Kobe-shi (JP);
Kobelco Construction Machinery Co., Ltd., Hiroshima-shi (JP)

(72) Inventors: Yoshiaki Kitamura, Kobe (JP);
Takayuki Doi, Hiroshima (JP); Naoki Goto, Hiroshima (JP)

(73) Assignees: Kobe Steel, Ltd., Kobe-shi (JP);
Kobelco Construction Machinery Co., Ltd., Hiroshima-shi (JP)

( * ) Notice: Subject to any disclaimer, the term of this patent is extended or adjusted under 35 U.S.C. 154(b) by 37 days.

(21) Appl. No.: 14/028,967

(22) Filed: Sep. 17, 2013

(65) Prior Publication Data
US 2014/0091579 A1 Apr. 3, 2014

(30) Foreign Application Priority Data
Sep. 28, 2012 (JP) ................... 2012-217465

(51) Int. Cl.
| F02N 11/06 | (2006.01) |
| H02P 9/04 | (2006.01) |
| B60L 11/18 | (2006.01) |
| E02F 9/20 | (2006.01) |
| B60L 9/00 | (2006.01) |

(52) U.S. Cl.
CPC ........... B60L 11/1814 (2013.01); E02F 9/2091 (2013.01)
USPC ............. 290/40 R; 701/22; 318/139; 320/123

(58) Field of Classification Search
USPC ............. 290/40 R; 701/22; 318/139; 320/123
See application file for complete search history.

(56) References Cited

U.S. PATENT DOCUMENTS

| 6,137,250 | A | * | 10/2000 | Hirano et al. ................ 318/376 |
| 6,166,449 | A | * | 12/2000 | Takaoka et al. ............. 290/40 B |
| 6,314,347 | B1 | * | 11/2001 | Kuroda et al. ................ 701/22 |
| 6,321,143 | B1 | * | 11/2001 | Phillips et al. ................ 701/22 |
| 6,344,732 | B2 | * | 2/2002 | Suzuki ........................ 320/132 |
| 6,362,602 | B1 | * | 3/2002 | Kozarekar .................... 320/160 |
| 6,487,477 | B1 | * | 11/2002 | Woestman et al. ............. 701/22 |
| 6,687,581 | B2 | * | 2/2004 | Deguchi et al. ................ 701/22 |
| 6,696,815 | B1 | * | 2/2004 | Kikuchi ........................ 320/104 |
| 6,814,686 | B2 | * | 11/2004 | Carriere et al. ................. 477/6 |
| 6,852,062 | B1 | * | 2/2005 | Ahner et al. .................... 477/2 |
| 6,986,398 | B2 | * | 1/2006 | Obayashi .................... 180/65.28 |
| 7,317,259 | B2 | * | 1/2008 | Yamauchi ................... 290/40 C |

(Continued)

FOREIGN PATENT DOCUMENTS

JP 2010-193630 9/2010

*Primary Examiner* — Pedro J Cuevas
(74) *Attorney, Agent, or Firm* — Oblon, McClelland, Maier & Neustadt, L.L.P.

(57) ABSTRACT

A charge and discharge control unit (41) sets an upper-limit charge and discharge electric power as an upper limit of electric power during charging and discharging of a electric storage device (11) based on temperature of the electric storage device (11) measured by a temperature measuring unit (21) and a state of charge of the electric storage device (11) specified by a charge state specifying unit (23). In the case where the operation state determined by an operation state determining unit (35) is a low-limit operation state, the charge and discharge control unit (41) sets the upper-limit charge and discharge electric power to be larger than that in the case where the operation state determined by the operation state determining unit (35) is a high-limit operation state.

7 Claims, 5 Drawing Sheets

(56) References Cited

U.S. PATENT DOCUMENTS

| | | | |
|---|---|---|---|
| 7,647,994 B1* | 1/2010 | Belloso | 180/65.31 |
| 7,740,092 B2* | 6/2010 | Bender | 180/65.29 |
| 7,885,737 B2* | 2/2011 | Hirata et al. | 701/22 |
| 8,022,674 B2* | 9/2011 | Miura | 320/132 |
| 8,146,692 B2* | 4/2012 | Kikuchi | 180/65.29 |
| 8,547,040 B2* | 10/2013 | Kamachi | 318/139 |
| 8,825,242 B2* | 9/2014 | Foster | 701/22 |
| 8,880,265 B2* | 11/2014 | Goto et al. | 701/22 |
| 2003/0098187 A1* | 5/2003 | Phillips et al. | 180/65.3 |
| 2004/0168449 A1* | 9/2004 | Homan et al. | 62/134 |
| 2007/0151783 A1* | 7/2007 | Yamauchi | 180/65.3 |
| 2009/0015202 A1* | 1/2009 | Miura | 320/132 |
| 2009/0319110 A1* | 12/2009 | Tani et al. | 701/22 |
| 2010/0268407 A1* | 10/2010 | Yanagisawa | 701/22 |
| 2010/0280698 A1* | 11/2010 | Ichikawa | 701/22 |
| 2010/0305794 A1* | 12/2010 | Foster | 701/22 |
| 2011/0251746 A1* | 10/2011 | Wu et al. | 701/22 |
| 2012/0065826 A1* | 3/2012 | Kinoshita et al. | 701/22 |
| 2013/0131900 A1* | 5/2013 | Yu et al. | 701/22 |
| 2013/0264975 A1* | 10/2013 | Kaita et al. | 318/139 |
| 2013/0323540 A1* | 12/2013 | Matsusue | 429/9 |
| 2014/0067176 A1* | 3/2014 | Goto et al. | 701/22 |
| 2014/0074331 A1* | 3/2014 | Shin et al. | 701/22 |
| 2014/0148984 A1* | 5/2014 | Nishi et al. | 701/22 |
| 2014/0247018 A1* | 9/2014 | Kikuchi et al. | 320/150 |

* cited by examiner

CONSTRUCTION MACHINE

BACKGROUND OF INVENTION

1. Technical Field of Invention

The invention relates to a construction machine that includes a control unit that controls charging and discharging of an electric storage device.

2. Description of Background Art

In the related art, a construction machine such as a hybrid construction machine or an electric construction machine that includes an electric storage device and a control unit that controls charging and discharging of the electric storage device in order to suppress the deterioration of the electric storage device is known (for example, Japanese Unexamined Patent Publication No. 2010-193630, hereinafter it is called patent literature 1.).

In the construction machine disclosed in patent literature 1, the charge and discharge current of the electric storage device is limited according to the magnitude of internal resistance of the electric storage device based on information indicating an outside air temperature and the magnitude of an internal resistance of the electric storage device based on information (integrated use time) indicating deterioration of the electric storage device (see claims 1 and 4 and paragraphs [0025] to [0028]).

As in the technique disclosed in patent literature 1, providing a limiting value for the charge and discharge current of the electric storage device according to the magnitude of the internal resistance of the electric storage device is essential to suppress the deterioration of the electric storage device and secure the safety thereof.

However, the magnitude of the internal resistance of the electric storage device also changes according to an operation state of the construction machine. Therefore, as in the construction machine disclosed in patent literature 1, even when the charge and discharge current is controlled according to the magnitude of the internal resistance based on the outside air temperature and deterioration of the electric storage device, the charge and discharge current of the electric storage device may be limited too excessively in an operation state where the internal resistance of the electric storage device is maintained to a low value.

In this case, the ability of the electric storage device is unnecessarily suppressed due to the limited charge and discharge current, and excessive performance (specification) is required for the electric storage device to exercise sufficient ability in such a situation.

As a result, the cost of the electric storage device increases, and the size of the electric storage device may increase. An increase in the size of the electric storage device makes compression on the layout of equipment of the construction machine.

SUMMARY OF INVENTION

An object of the present invention is to provide a construction machine capable of suppressing excessive limiting of the charge and discharge electric power of an electric storage device while suppressing the deterioration of the electric storage device and securing the safety thereof.

In order to solve the problem, the present invention provides a construction machine including: an electric storage device; a generator motor that has a function of operating as a motor by electric power supplied from the electric storage device and a function of operating as a generator by motive power supplied from outside; an electric power control unit that controls the delivery of electric power between the electric storage device and the generator motor; a charge and discharge control unit that outputs an instruction for controlling charge and discharge electric power of the electric storage device to the electric power control unit; a temperature measuring unit that measures temperature of the electric storage device; a charge state specifying unit that specifies a state of charge of the electric storage device; and an operation state determining unit that determines whether an operation state of the construction machine is a preset high-limit operation state or a preset low-limit operation state which is other than the high-limit operation state and set in advance as an operation state where an internal resistance of the electric storage device is maintained in a lower range than that of the high-limit operation state, in which the charge and discharge control unit sets an upper-limit charge and discharge electric power as an upper limit of the electric power during charging and discharging of the electric storage device based on the temperature of the electric storage device measured by the temperature measuring unit and the state of charge of the electric storage device specified by the charge state specifying unit, and in the case where the operation state determined by the operation state determining unit is the low-limit operation state, the charge and discharge control unit sets the upper-limit charge and discharge electric power to be larger than that in the case where the operation state determined by the operation state determining unit is the high-limit operation state.

According to the present invention, it is possible to suppress excessive limiting of the charge and discharge electric power of an electric storage device while suppressing the deterioration of the electric storage device and securing the safety thereof.

DETAILED DESCRIPTION OF PREFERRED EMBODIMENT OF INVENTION

Hereinafter, an embodiment of the present invention is described with reference to the accompanying drawings. The embodiment described below is one example a concrete embodiment of the present invention, and is not intended to limit the technical scope of the present invention.

Figure 1:
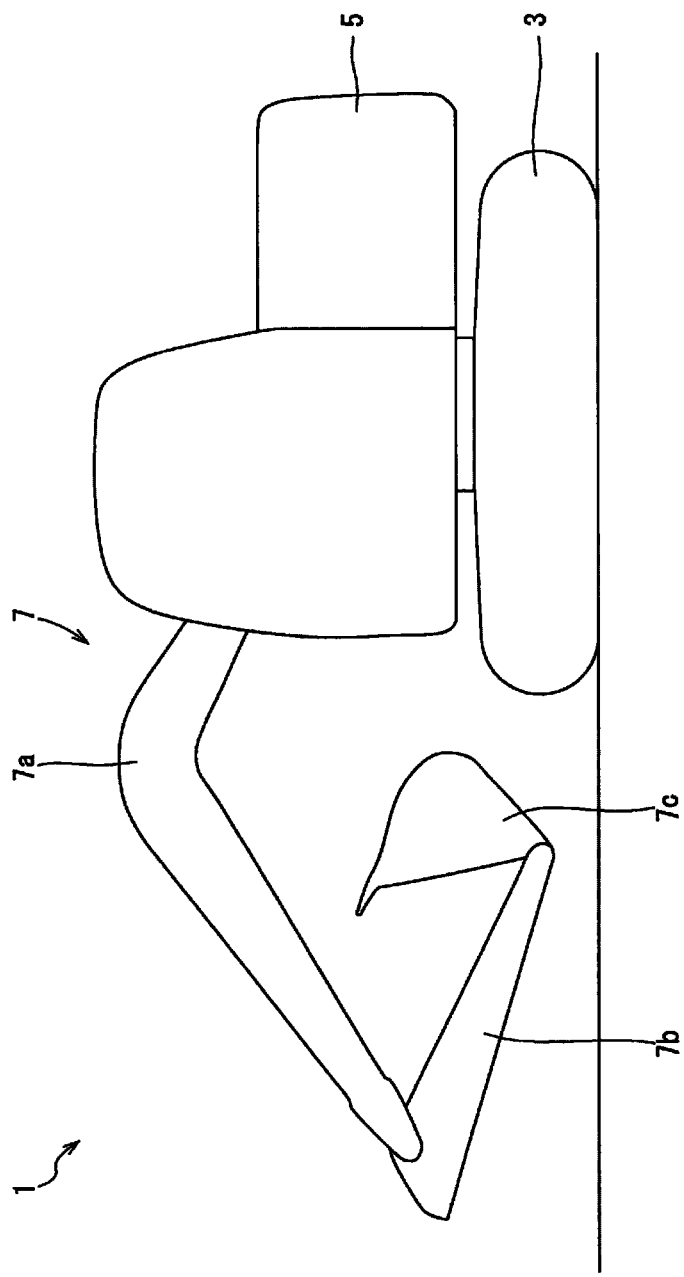
FIG. 1 is a left side view illustrating an entire configuration of a construction machine according to an embodiment of the present invention.

FIG. 1 illustrates a shovel 1 which is an example of a construction machine according to the present embodiment. The shovel 1 performs operations such as an excavation operation, for example.

The shovel 1 includes a hybrid system that uses fossil fuel and electricity or an electric system that uses electricity only as its driving system (hereinafter, the shovel 1 having the hybrid system is described as an example).

Figure 2:
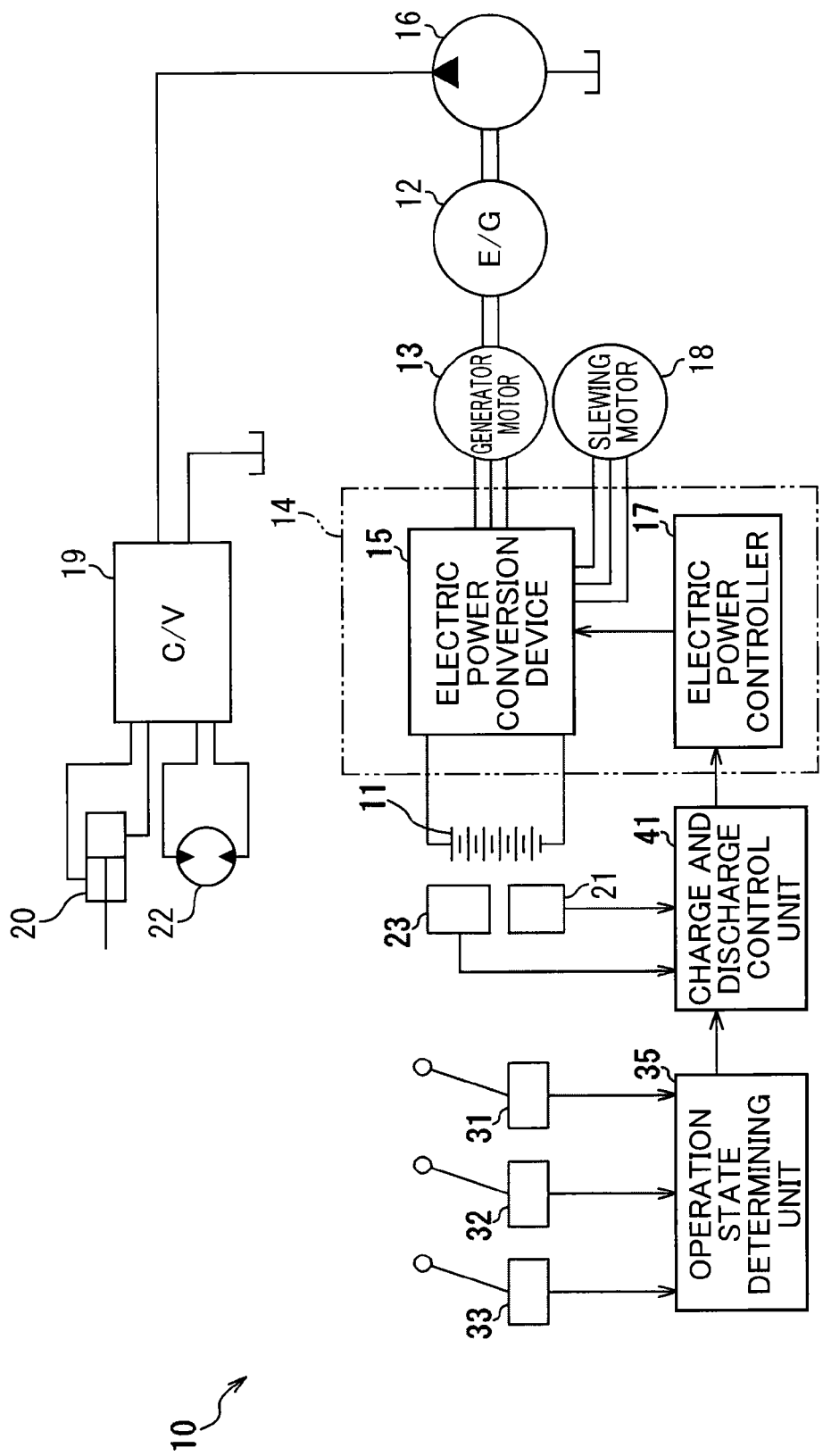
FIG. 2 is a block diagram illustrating mainly an electrical configuration of a charge and discharge control device provided in the construction machine illustrated in FIG. 1.

The shovel 1 includes a self-propelling type lower propelling body 3, an upper slewing body 5 provided so as to slew with respect to the lower propelling body 3, a propelling motor 22 (see FIG. 2) for allowing the lower propelling body 3 to propel, an attachment 7 attached to the upper slewing body 5 so as to be displaced, and a charge and discharge control device 10 (see FIG. 2).

The attachment 7 includes a boom 7a attached to the upper slewing body 5 so as to be raised and lowered, an arm 7b attached to a distal end of the boom 7a so as to rotate, and a bucket 7c (which may be a fork or the like) attached to a distal end of the arm 7b so as to rotate.

In addition, although not illustrated in FIG. 1, the attachment 7 includes a boom cylinder that allows the boom 7a to be raised and lowered with respect to the upper slewing body 5, an arm cylinder that allows the arm 7b to rotate with respect to the boom 7a, and a bucket cylinder that allows the bucket 7c to rotate with respect to the arm 7b. The boom cylinder, the arm cylinder, and the bucket cylinder are depicted as one hydraulic cylinder 20 in FIG. 2.

Referring to FIG. 2, the charge and discharge control device 10 is a device that controls charging and discharging of the electric storage device 11.

The charge and discharge control device 10 includes an electric storage device 11, an engine 12, a hydraulic pump 16 driven by the engine 12 to discharge pressurized oil, a generator motor 13 and a slewing motor 18 (each being an example of a generator motor) having a function of operating as a motor by electric power supplied from the electric storage device 11 and a function of operating as a generator by motive power supplied from the outside, an electric power control unit 14 that controls delivery of electric power between the electric storage device 11 and the generator motor 13 and slewing motor 18, a charge and discharge control unit 41 that outputs an instruction for controlling charge and discharge power of the electric storage device 11 to the electric power control unit 14, a temperature measuring unit 21 that measures the temperature of the electric storage device 11, a charge state specifying unit 23 that specifies a state of charge (hereinafter referred to as SOC) of the electric storage device 11, a propelling lever 31, a slewing lever 32, and a displacement lever 33 (each being an example of an operating lever) that are operated by an operator to allow the shovel 1 to operate, and an operation state determining unit 35 that determines the operation state of the shovel 1.

The electric storage device 11 is a secondary battery that can discharge and store electrical energy. The electric storage device 11 includes a nickel-hydrogen battery, a lithium-ion battery, or the like, for example. The electric storage device 11 has larger energy capacity than a capacitor (for example, an electric double-layer capacitor) and is thus used for applications where continuous charge and discharge (that cannot be realized by capacitors) are required.

In the case where a terminal-to-terminal voltage of the electric storage device 11 exceeds a preset highest voltage V_max, and in the case where the terminal-to-terminal voltage is lower than a lowest voltage V_min, the deterioration of the electric storage device 11 may progress and the safety thereof may be impaired.

Thus, the allowable value (the electric power that can be charged and discharged) of the charge and discharge electric power of the electric storage device 11 is set so as to fall within a range in which the terminal-to-terminal voltage of the electric storage device 11 is not smaller than the lowest voltage V_min but not larger than the highest voltage V_max.

One of the main factors that determine the allowable value of the charge and discharge electric power of the electric storage device 11 is the internal resistance of the electric storage device 11. As the internal resistance of the electric storage device 11 increases, the allowable value of the charge and discharge electric power of the electric storage device 11 decreases.

Here, the internal resistance of the electric storage device 11 be described. The internal resistance of the electric storage device 11 is determined by SOC (charging rate), a temperature state, a deterioration state, a continuous charge and discharge time, and the like. Specifically, the internal resistance of the electric storage device 11 increases in a low-temperature state, a deteriorated state, and the like.

Figure 3:
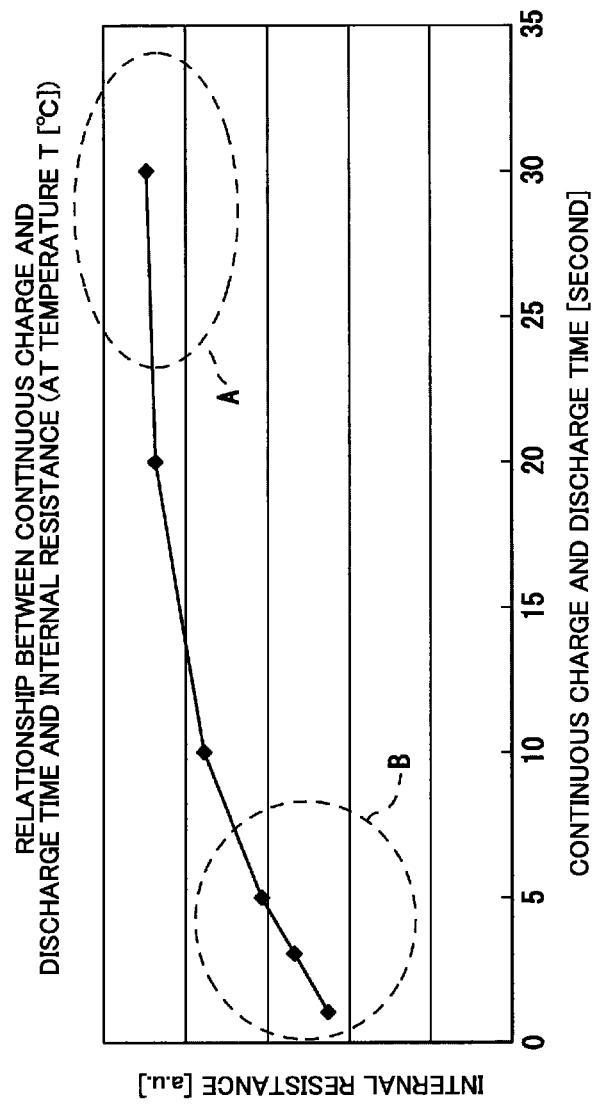
FIG. 3 is a graph illustrating relationship between continuous charge and discharge time and internal resistance of the electric storage device illustrated in FIG. 2.

Moreover, as illustrated in FIG. 3, the internal resistance (apparent internal resistance) of the electric storage device 11 increases as the continuous charge and discharge time (continuous current-carrying time) increases. FIG. 3 is a graph illustrating relationship between continuous charge and discharge time and internal resistance in the case where the temperature of the electric storage device 11 is at a certain temperature T [° C.].

Region A in FIG. 3 is a region where the continuous charge and discharge time of the electric storage device 11 is long (several tens of seconds, for example, approximately 20 seconds or longer) and the influence of polarization of the electric storage device 11 almost disappears.

Region B in FIG. 3 is a region where the continuous charge and discharge time of the electric storage device 11 is short (several seconds, for example, approximately 10 seconds or shorter). In Region B, the apparent internal resistance is lower than that of Region A due to the influence of polarization of the electric storage device 11.

Referring to FIG. 2, the hydraulic pump 16 supplies pressurized oil to the hydraulic cylinder 20 in order to displace the propelling motor 22 and the attachment 7. Here, a control valve 19 that regulates the supply of pressurized oil from the hydraulic pump 16 to the hydraulic cylinder 20 and the propelling motor 22 is formed between the hydraulic pump 16 and the hydraulic cylinder 20 and propelling motor 22. Although only one control valve 19 is illustrated in FIG. 2 for the sake of convenience, the control valve is provided in each of the hydraulic cylinder 20 (the boom cylinder, the arm cylinder, and the bucket cylinder) and the propelling motor 22.

The generator motor 13 drives the shovel 1 (in the following description, see FIG. 1 for the shovel 1) by consuming the electric power from the electric storage device 11 to operate as a motor (motor operation). Specifically, in the case where the hydraulic cylinder 20 and the propelling motor 22 operate, the generator motor 13 operates as a motor to assist the engine 12 that supplies motive power to the hydraulic pump 16.

Moreover, the generator motor 13 converts the motive power supplied from the engine 12 into electric power (generator operation). The generator motor 13 is connected to the electric storage device 11 via an electric power conversion device 15 (the electric power control unit 14).

The slewing motor 18 causes the upper slewing body 5 to slew by consuming the electric power from the electric storage device 11 to operate as a motor (motor operation). Moreover, the slewing motor 18 converts the inertial energy of the upper slewing body 5 into electric power in the case where the slewing of the upper slewing body 5 decelerates (generator operation). The slewing motor 18 is connected to the electric storage device 11 via the electric power conversion device 15 (the electric power control unit 14).

The electric power control unit 14 includes the electric power conversion device 15 for delivering electric power between the electric storage device 11 and the generator motor 13 and slewing motor 18 and an electric power controller 17 that is connected to the electric power conversion device 15 to control the electric power delivered by the electric power conversion device 15.

The electric power conversion device 15 includes an inverter circuit and a converter circuit. The inverter circuit converts DC electric power from the electric storage device 11 into AC electric power and supplies the AC electric power to the generator motor 13 and the slewing motor 18. The converter circuit converts AC electric power from the generator motor 13 and the slewing motor 18 into DC electric power and supplies the DC electric power to the electric storage device 11.

The electric power controller 17 has the function of a motive power controller that controls the driving of the generator motor 13 and the slewing motor 18 and the function of a charge controller that controls the charge electric power of the electric storage device 11.

The temperature measuring unit 21 measures (observes) the temperature of the electric storage device 11.

The charge state specifying unit 23 specifies the SOC of the electric storage device 11. Specifically, the charge state specifying unit 23 detects an output current and the terminal-to-terminal voltage of the electric storage device 11. Here, since the terminal-to-terminal voltage of the electric storage device 11 depends on temperature, the charge state specifying unit 23 corrects the terminal-to-terminal voltage using the temperature measured by the temperature measuring unit 21. Moreover, the charge state specifying unit 23 calculates the electric power of the electric storage device 11 based on the output current and terminal-to-terminal voltage of the electric storage device 11 and calculates a charge level based on the electric power. Further, the charge state specifying unit 23 calculates SOC as the ratio of the calculated charge level to the largest charge level of the electric storage device 11.

Since the charge state specifying unit 23 calculates the SOC using the temperature of the electric storage device 11 as described above, the temperature measuring unit 21 may be integrated as a part of the function of the charge state specifying unit 23.

The propelling lever 31 is operated by the operator of the shovel 1 to allow the lower propelling body 3 (see FIG. 1) to propel. In response to the operation of the propelling lever 31, an instruction (an electrical signal or pilot pressure) for operating the control valve 19 is output.

The slewing lever 32 is operated by the operator to allow the upper slewing body 5 (see FIG. 1) to slew. In response to the slewing lever 32, an instruction (an electrical signal) for driving the slewing motor 18 is output.

The displacement lever 33 is operated by the operator to allow the attachment 7 (see FIG. 1) to perform a displacement operation. In response to the operation of the displacement lever 33, an instruction (an electrical signal or pilot pressure) for operating the control valve 19 is output.

The operation state determining unit 35 determines (judges) an operation state (operation mode) of the shovel 1. Specifically, the operation state determining unit 35 determines whether the operation state of the shovel 1 is a preset high-limit operation state or a preset low-limit operation state which is other than the high-limit operation state and set in advance as an operation range where the internal resistance of the electric storage device 11 is maintained in a lower range than that of the high-limit operation state.

The low-limit operation state is an operation state where the expected time for the continuous charge time or the continuous discharge time (hereinafter referred to as continuous charge or discharge time) of the electric storage device 11 is shorter than that of the high-limit operation state.

Specifically, the low-limit operation state is an operation state where the expected time for the continuous charge or discharge time of the electric storage device 11 is several seconds (for example, approximately 10 seconds or shorter, and approximately 5 seconds or shorter). That is, in the low-limit operation state, it is expected that the electric storage device 11 is charged or discharged while the internal resistance of the electric storage device 11 follows the movement in Region B illustrated in FIG. 3.

On the other hand, the high-limit operation state is an operation state where the expected time for the continuous charge or discharge time of the electric storage device 11 is several tens of seconds or longer (for example, longer than approximately 10 seconds, approximately 20 seconds or longer, and several minutes). That is, in the high-limit operation state, it is expected that the electric storage device 11 is charged or discharged while the internal resistance of the electric storage device 11 follows the movement in Region A illustrated in FIG. 3.

Moreover, the low-limit operation state is a working state of the shovel 1. Specifically, the working state is a state where at least one of the displacement operation (attach work) of the attachment 7 illustrated in FIG. 1 and the revolving operation of the upper slewing body 5 is performed.

As illustrated in FIG. 2, during the attach work, the electric power discharged from the electric storage device 11 is supplied to the generator motor 13 (to assist the engine 12). During acceleration of slewing, the electric power discharged from the electric storage device 11 is supplied to the slewing motor 18. On the other hand, during deceleration of slewing, the electric power generated by the slewing motor 18 is charged to the electric storage device 11. These charging and discharging operations performed in the low-limit operation state are performed with larger electric power (larger current) than the charging and discharging operations of the electric storage device 11 in the high-limit operation state.

On the other hand, the high-limit operation state is a state where the shovel 1 propels or a standby state (idling state). Here, the standby state means a state where the displacement operation of the attachment 7, the slewing operation of the upper slewing body 5, and the propelling operation of the lower propelling body 3 are not performed.

During propelling, the electric power discharged from the electric storage device 11 is supplied to the generator motor 13 (to assist the engine 12). In the standby state, the electric power generated by the generator motor 13 using the motive power of the engine 12 in the idling state is charged to the electric storage device 11. The charging in this standby state is performed until at least one of the propelling lever 31, the slewing lever 32, and the displacement lever 33 is operated or until the electric storage device 11 is charged up to a predetermined SOC. These charging and discharging operations performed in the high-limit operation state are performed with smaller electric power (smaller current) than the charging and discharging operations of the electric storage device 11 in the low-limit operation state.

In the case where the shovel 1 is in a propelling state and in a working state, the operation state determining unit 35 determines that the shovel 1 is in the propelling state (the high-limit operation state). That is, the operation state determining unit 35 determines that the operation state where the propelling operation of the lower propelling body 3 is performed is the high-limit operation state regardless of whether at least one of the displacement operation of the attachment 7 and the slewing operation of the upper slewing body 5 is performed or not.

As illustrated in FIG. 2, the operation state determining unit 35 is connected to the propelling lever 31, the slewing lever 32, and the displacement lever 33 so as to be able to detect the instructions output from the respective levers 31 to 33.

The operation state determining unit 35 determines whether the shovel 1 is in the low-limit operation state based on the operation states of the slewing lever 32 and the displacement lever 33. Specifically, the operation state determining unit 35 determines whether the shovel 1 is in the low-limit operation state based on the lever signals (pilot pressure, an electrical signal, or the like) output from the slewing lever 32 and the displacement lever 33.

On the other hand, the operation state determining unit 35 determines whether the shovel 1 is in the high-limit operation state based on an operation state (a lever signal) of the propelling lever 31. Moreover, the operation state determining unit 35 determines that the shovel 1 is in the high-limit operation state if none of the levers 31 to 33 are operated.

The charge and discharge control unit 41 controls the charge and discharge electric power (charge electric power and discharge electric power) of the electric storage device 11. The charge and discharge control unit 41 is connected to the electric power conversion device 15 via the electric power controller 17. The charge and discharge control unit 41 outputs an electric power value (an instruction) delivered by the electric power conversion device 15 to the electric power conversion device 15 via the electric power controller 17.

Moreover, the charge and discharge control unit 41 is connected to the temperature measuring unit 21, the charge state specifying unit 23, and the operation state determining unit 35. The charge and discharge control unit 41 sets an upper limit (upper-limit charge and discharge electric power) of the electric power during charging and discharging of the electric storage device 11 based on the operation state (battery operation state) of the electric storage device 11 and the operation state of the shovel 1. The upper-limit charge and discharge electric power includes an upper-limit charge electric power (allowable charge electric power) and an upper-limit discharge electric power (allowable discharge electric power).

Specifically, the charge and discharge control unit 41 sets the upper-limit charge and discharge electric power based on the temperature of the electric storage device 11 measured by the temperature measuring unit 21, the SOC specified by the charge state specifying unit 23, and the operation state determined by the operation state determining unit 35.

Moreover, the charge and discharge control unit 41 stores in advance the highest voltage V_max and the lowest voltage V_min for the terminal-to-terminal voltage of the electric storage device 11. The charge and discharge control unit 41 sets the upper-limit charge and discharge electric power so that the terminal-to-terminal voltage of the electric storage device 11 is not larger than the highest voltage V_max but not smaller than the lowest voltage V_min (details will be described later). The highest voltage V_max and the lowest voltage V_min are determined so that deterioration of the electric storage device 11 can be suppressed and the safety thereof can be secured.

Figure 4:
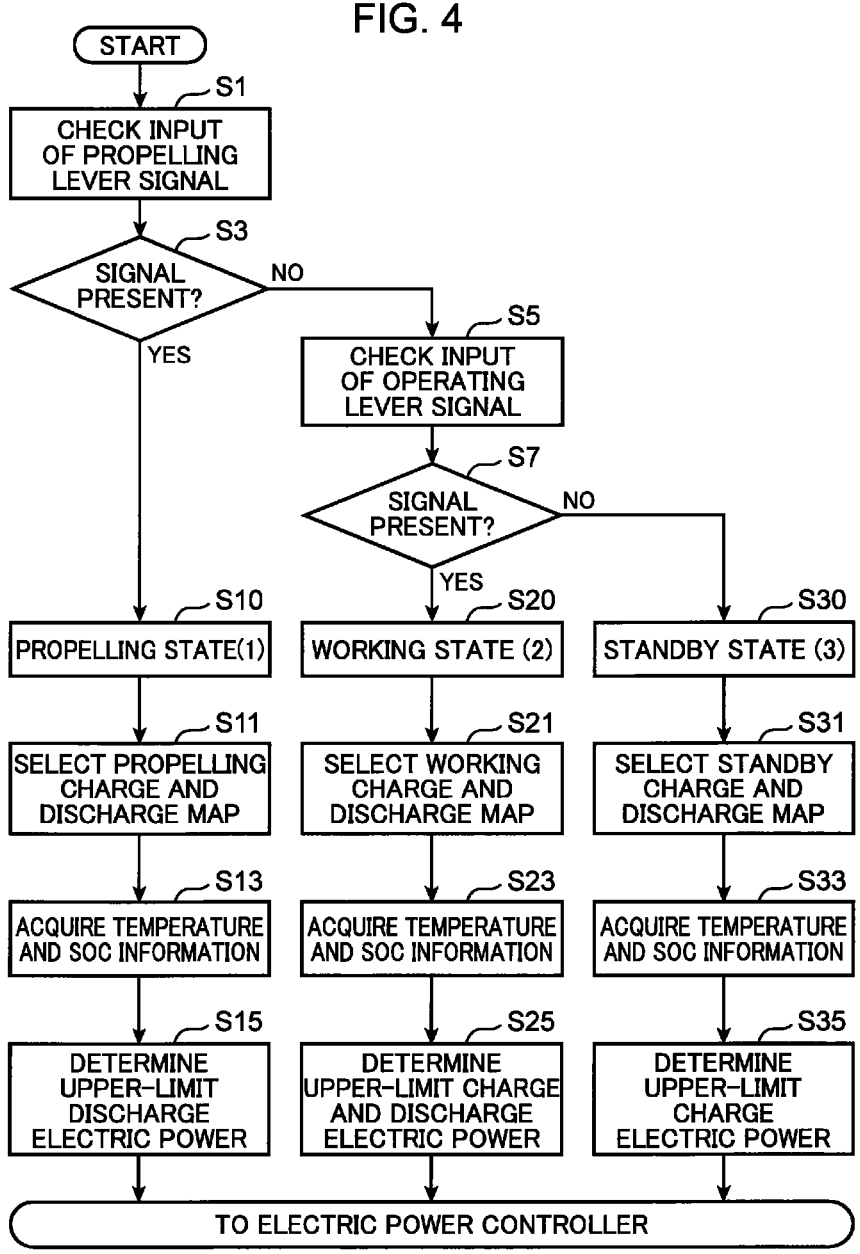
FIG. 4 is a flowchart illustrating a process executed by the charge and discharge control device illustrated in FIG. 2 to set an upper-limit charge and discharge electric power.

Next, the function of the charge and discharge control device 10 (see FIG. 2) is described. In the following description, FIG. 1 is referred to for the shovel 1, FIG. 2 is referred to for the constituent components of the charge and discharge control device 10, and FIG. 4 is referred to for steps S1 to S35 executed by the charge and discharge control device 10.

First, an overview of the process executed by the charge and discharge control device 10 is described.

The operation state determining unit 35 determines whether the shovel 1 is in the high-limit operation state or the low-limit operation state (steps S1 to S7). In the case where it is determined that the shovel 1 is in the high-limit operation state (steps S10 and S30), the charge and discharge control unit 41 sets the upper-limit charge and discharge electric power (steps S15 and S35). On the other hand, In the case where it is determined that the shovel 1 is in the low-limit operation state (step S20), the charge and discharge control unit 41 sets the upper-limit charge and discharge electric power to be larger than the upper-limit charge and discharge electric power in the high-limit operation state (step S25).

Hereinafter, the details of the process executed by the charge and discharge control device 10 will be described.

In steps S1, S3, S5, and S7, the operation state of the shovel 1 is determined by the operation state determining unit 35.

In step S1, the operation state determining unit 35 checks whether the lever signal of the propelling lever 31 is input. Subsequently, the flow proceeds to step S3.

In step S3, the operation state determining unit 35 determines whether the lever signal of the propelling lever 31 is present.

In the case where the lever signal of the propelling lever 31 is present (step S3: YES), it is determined that the operation state of the shovel 1 is the propelling state (1) (step S10). Here, the operation state determining unit 35 outputs the determination result to the charge and discharge control unit 41 (the determination result is also output in the case where the operation state is determined to be the working state (2) and the standby state (3) described later in steps S20 and S30).

On the other hand, in the case where the lever signal of the propelling lever 31 is not present (step S3: NO), the process proceeds to step S5.

In step S5, the operation state determining unit 35 checks whether the lever signals of the slewing lever 32 and displacement lever 33 (both are collectively referred to as an operating lever in FIG. 4) are input. Subsequently, the process proceeds to step S7.

In step S7, the operation state determining unit 35 determines whether the lever signal of at least one of the slewing lever 32 and the displacement lever 33 is present.

In the case where the lever signal of at least one of the slewing lever 32 and the displacement lever 33 is present (step S7: YES), it is determined that the operation state of the shovel 1 is the working state (2) (step S20).

On the other hand, in the case where the lever signals of both the slewing lever 32 and the displacement lever 33 are not present (step S7: NO), it is determined that the operation state of the shovel 1 is the standby state (idle state) (3) (step S30).

Figure 5:
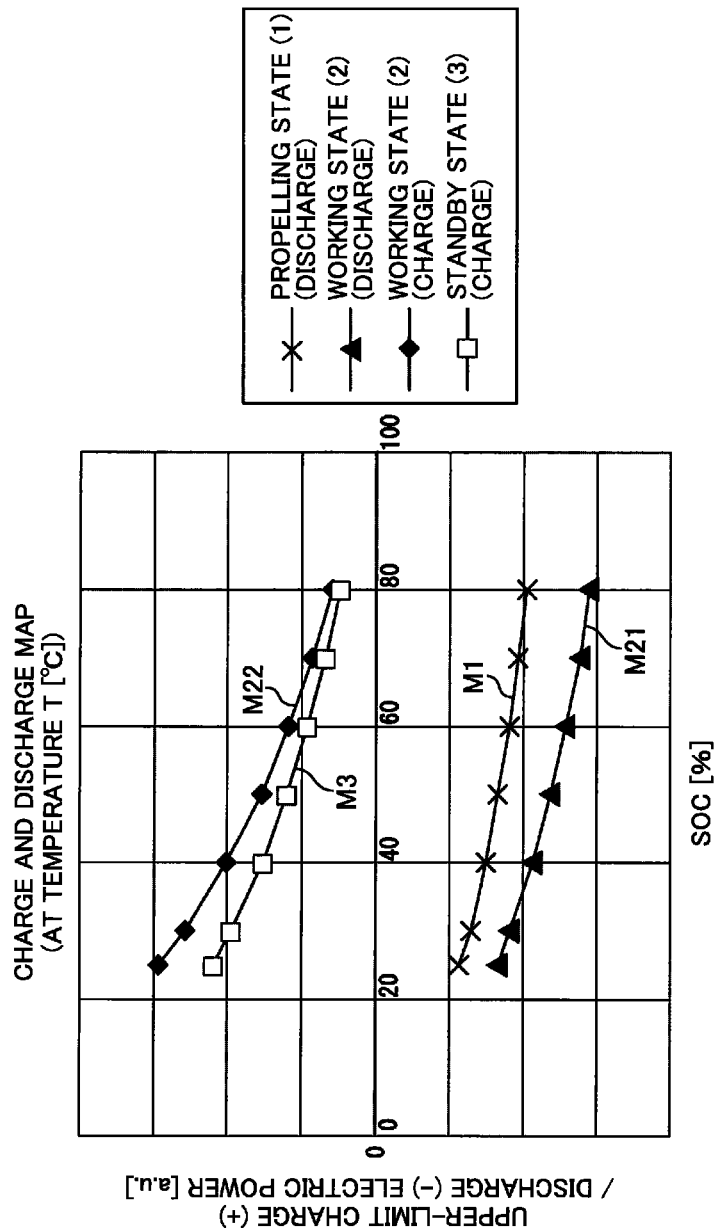
FIG. 5 illustrates an example of a charge and discharge map stored in a charge and discharge control unit illustrated in FIG. 2.

In steps S11, S21, and S31, a process of selecting a charge and discharge map (charge and discharge control map) illustrated in FIG. 5 is executed. Here, the charge and discharge map is prepared for each of the propelling state, the working state, and the standby state and is stored in advance in the charge and discharge control unit 41.

The selection in steps S11, S21, and S31 is executed by the charge and discharge control unit 41 based on the operation state determined by the operation state determining unit 35.

Specifically, in the case of the propelling state (1) (step S10), a propelling charge and discharge map M1 is selected (step S11), and the process proceeds to step S13.

In the case of the working state (2) (step S20), a working charge and discharge map M21 is selected during the attach work and/or the acceleration of slewing and a working charge and discharge map M22 is selected during the deceleration of slewing (step S21), and the process proceeds to step S23. During the attach work and the deceleration of slewing, both maps M21 and M22 are selected.

In the case of the standby state (3) (step S30), a standby charge and discharge map M3 is selected (step S31), and the process proceeds to step S33.

Details of the respective charge and discharge maps M1, M21, M22, and M3 is described later.

In steps S13, S23, and S33, the charge and discharge control unit 41 acquires the temperature and the information (SOC information) on the state of charge of the electric storage device 11. Specifically, these items of information are input to the charge and discharge control unit 41 from the temperature measuring unit 21 and the charge state specifying unit 23. Subsequently, the process proceeds to step S15 in the case where the operation state is the propelling state (1), to step S25 in the case where the operation state is the working state (2), and to step S35 in the case where the operation state is the standby state (3).

In steps S15, S25, and S35, the upper-limit charge and discharge electric power of the electric storage device 11 is determined by the charge and discharge control unit 41. The upper-limit charge and discharge electric power is determined according to the charge and discharge maps M1, M21, M22, and M3 selected in steps S11, S21, or S31.

Further, the upper-limit charge and discharge electric power is determined based on the temperature and the SOC information of the electric storage device 11 acquired in step S13, S23, or S33. Specifically, the charge and discharge control unit 41 specifies the upper-limit charge and discharge electric power corresponding to the SOC obtained by the charge state specifying unit 23 in the respective charge and discharge maps M1, M21, M22, and M3. Here, as illustrated in FIG. 5, since the respective charge and discharge maps M1, M21, M22, and M3 are maps in the case where the electric storage device 11 is at a specific temperature T, the upper-limit charge and discharge electric power is corrected based on the temperature of the electric storage device 11 measured by the temperature measuring unit 21. That is, the upper-limit charge electric power is corrected so as to be ideal for the internal resistance of the electric storage device 11 corresponding to the temperature of the electric storage device 11.

Moreover, the charge and discharge control unit 41 outputs the upper-limit charge and discharge electric power determined as above to the electric power controller 17. The electric power controller 17 controls the electric power conversion device 15 based on the upper-limit charge and discharge electric power. As a result, the electric power (the motive power of the generator motor 13) supplied from the electric storage device 11 to the generator motor 13 or the electric power (charge electric power) supplied from the generator motor 13 to the electric storage device 11 is controlled.

FIG. 5 illustrates an example of setting the charge and discharge map in the respective operation states. The charge and discharge map illustrates the relationship between the SOC (horizontal axis) and the upper-limit charge and discharge electric power (vertical axis) of the electric storage device 11. Moreover, in the charge and discharge map, the upper-limit charge electric power is illustrated as a positive value, and the upper-limit discharge electric power is illustrated as a negative value. Further, the charge and discharge map is a map in the case where the temperature of the electric storage device 11 is T [° C.].

First, items common to the respective operation states among the items set for the charge and discharge map is described. The larger the state of charge (SOC), the smaller is set the upper-limit charge electric power (the absolute value thereof). Moreover, the larger the state of charge (SOC), the larger is set the upper-limit discharge electric power (the absolute value thereof). This is because, the larger the SOC, the more is accelerated the discharge of the electric storage device 11 and the stricter is the limit of the charge whereby the electric storage device 11 is protected.

Next, items different for the respective operation states among the items set for the charge and discharge map is described.

The upper-limit discharge electric power (the absolute value thereof) in the propelling state (1) (high-limit operation state) is set to be smaller (lower) than the upper-limit discharge electric power (the absolute value thereof) in the working state (2) (that is, the limit of the discharge electric power in the propelling state (1) is set to be higher than that in the working state (2)). The reasons therefor are as follows.

In the propelling state (1), it is expected that the electric storage device 11 is discharged while the internal resistance of the electric storage device 11 follows the movement in Region A (see FIG. 3). Thus, it is necessary to suppress the discharge electric power as compared to the low-limit operation state (see Region B of FIG. 3) where the internal resistance of the electric storage device 11 is lower than that of the propelling state.

Moreover, in the charge and discharge map illustrated in FIG. 5, the upper-limit discharge electric power is set based on the internal resistance in Region A and the lowest voltage V_min of the electric storage device 11. Specifically, the upper-limit discharge electric power is set so that, in the case where the voltage of the electric storage device 11 is changed from an open voltage in a certain state of charge (SOC), the voltage of the electric storage device 11 does not fall below the lowest voltage V_min (to be V_min or more).

The upper-limit discharge electric power (the absolute value thereof) in the working state (2) (low-limit operation state) is set to be larger (higher) than the upper-limit discharge electric power (the absolute value thereof) in the propelling state (1) (that is, the limit of the discharge electric power in the working state (2) is set to be lower than that in the propelling state (1)). Moreover, the upper-limit charge electric power in the working state (low-limit operation state) is set to be larger (higher) than the upper-limit charge electric power in the standby state (3) (that is, the limit of the upper-limit charge electric power in the working state (2) is set to be lower than that in the standby state (3)). The reasons therefor are as follows.

In the working state (2), it is expected that the electric storage device 11 is charged and discharged while the internal resistance of the electric storage device 11 follows the movement in Region B (see FIG. 3). Thus, it is possible to increase the charge and discharge electric power as compared to the high-limit operation state (see Region A of FIG. 3) where the internal resistance of the electric storage device 11 is higher than that of the working state.

Moreover, in the charge and discharge map illustrated in FIG. 5, the upper-limit charge and discharge electric power is set based on the internal resistance in Region B and the highest voltage V_max of the electric storage device 11. Specifically, the upper-limit charge electric power is set so that, in the case where the voltage of the electric storage device 11 is changed from an open voltage in a certain state of charge (SOC), the voltage of the electric storage device 11 does not exceed the highest voltage V_max (to be V_max or smaller). Further, the upper-limit discharge electric power is set so that, in the case where the voltage of the electric storage device 11 is changed from an open voltage in a certain state of charge (SOC), the voltage of the electric storage device 11 does not fall below the lowest voltage V_min.

The upper-limit charge electric power in the standby state (3) (high-limit operation state) is set to be smaller (lower) than the upper-limit charge electric power in the working state (2). The reasons therefor are as follows.

In the standby state (3) (high-limit operation state), it is expected that the electric storage device 11 is charged while the internal resistance of the electric storage device 11 follows the movement in Region A (see FIG. 3). Thus, it is necessary to suppress the charge electric power as compared to the low-limit operation state (see Region B of FIG. 3) where the internal resistance of the electric storage device 11 is lower than that of the standby state.

Moreover, in the charge and discharge map illustrated in FIG. 5, the upper-limit charge electric power is set based on the internal resistance in Region A and the highest voltage V_max of the electric storage device 11.

As described above, the shovel 1 includes the electric storage device 11, the generator motor 13 and the slewing motor 18 connected to the electric storage device 11, the electric power control unit 14 that controls the delivery of electric power between the electric storage device 11 and the generator motor 13, the charge and discharge control unit 41 that controls the charge and discharge electric power of the electric storage device 11, the temperature measuring unit 21 that measures the temperature of the electric storage device 11, the charge state specifying unit 23 that specifies the state of charge of the electric storage device 11, and the operation state determining unit 35 that determines whether the operation state of the shovel 1 is the high-limit operation state or the low-limit operation state.

Here, the charge and discharge control unit 41 sets the upper-limit charge and discharge electric power as the upper limit of the electric power during charging and discharging of the electric storage device 11 based on the temperature measured by the temperature measuring unit 21 and the state of charge specified by the charge state specifying unit 23.

Moreover, in the case where the operation state determined by the operation state determining unit 35 is the low-limit operation state, the charge and discharge control unit 41 sets the upper-limit charge and discharge electric power to be larger than that of the high-limit operation state (see steps S10 to S15, steps S20 to S25, and steps S30 to S35 of FIG. 4).

In this manner, it is possible to limit the charging and discharging of the electric storage device 11 according to the internal resistance of the electric storage device 11 by setting the upper-limit charge and discharge electric power based on the temperature and the state of charge of the electric storage device 11.

Here, the upper-limit charge and discharge electric power in the case where the operation state is determined to be the low-limit operation state is set to be larger than the upper-limit charge and discharge electric power in the case where the operation state is the high-limit operation state. That is, the limit of the charge and discharge electric power in the low-limit operation state is relaxed more than that in the high-limit operation state.

Therefore, it is possible to suppress the charge and discharge electric power from being limited excessively in the low-limit operation state where the internal resistance of the electric storage device 11 is maintained in a low range. As a result, it is not necessary for the electric storage device 11 to have excessive performance (capacity or the like), and it is possible to suppress an increase in the cost of the electric storage device 11 and to reduce the size of the electric storage device 11. Moreover, since the size of the electric storage device 11 can be reduced, it is possible to suppress the electric storage device 11 from making compression on the layout of the equipment of the shovel 1.

Therefore, it is possible to suppress excessive limiting in the charge and discharge electric power of the electric storage device 11 while suppressing the deterioration of the electric storage device 11 and securing the safety thereof.

More specifically, the expected continuous charge or discharge time of the electric storage device 11 is different depending on the operation state (for example, the propelling state (1), the working state (2), the standby state (3), or the like) of the shovel 1. Moreover, the internal resistance of the electric storage device 11 is different depending on the continuous charge or discharge time (see FIG. 3), and the allowable value (the allowable value capable of securing the safety of the electric storage device 11 and suppressing the deterioration thereof) of the charge and discharge electric power of the electric storage device 11 is different depending on a magnitude of the internal resistance. That is, the allowable value of the charge and discharge electric power of the electric storage device 11 is different depending on the operation state of the shovel 1.

Here, in the related art (the patent literature 1), the upper-limit charge and discharge electric power ("output of the battery" and "charge and discharge current of the battery" in the patent literature 1) of the electric storage device 11 is set without taking the operation state of the shovel 1 into consideration. Thus, in the related art, the upper-limit charge and discharge electric power may be set to be excessively on the safe side (that is, with a strict condition). As a result, it is necessary for the electric storage device 11 to have excessive performance (capacity or the like). On the other hand, the construction machine described above can suppress this problem.

The embodiment provides the following advantages.

The low-limit operation state is an operation state where the continuous charge or discharge time (continuous charge time or continuous discharge time) of the electric storage device 11 is shorter than that of the high-limit operation state.

As described above, the longer the continuous charge time and the continuous discharge time of the electric storage device 11, the smaller the influence of the polarization of the electric storage device 11, and therefore, the larger becomes the internal resistance of the electric storage device 11.

Therefore, by defining the low-limit operation state as in the above embodiment, it is possible to reliably determine the low-limit operation state where the internal resistance is maintained in a low range.

The operation state determining unit 35 determines that a working state where at least one of the slewing operation of the upper slewing body 5 and the displacement operation of the attachment 7 is performed is the low-limit operation state.

Since the slewing operation of the upper slewing body 5 and the displacement operation of the attachment 7 are highly frequently performed within a short period, it is expected that the continuous charge time and the continuous discharge time associated with these operations are relatively short.

Thus, according to the embodiment, it is possible to determine the low-limit operation state based on a specific operation.

On the other hand, since the propelling operation of the lower propelling body 3 is highly frequently performed for a longer period than the displacement operation of the attachment 7 and the slewing operation of the upper slewing body 5, it is expected that the continuous charge time and the continuous discharge time associated with the propelling operation is relatively long.

Therefore, as in the embodiment, the operation state determining unit 35 can determine that the state where the propelling operation of the lower propelling body 3 is performed is the high-limit operation state regardless of the slewing operation and the displacement operation of the attachment.

Moreover, in the embodiment, since it is determined that the standby state of the shovel 1 is the high-limit operation state, it is possible to suppress the deterioration of the electric storage device 11 by setting a small upper-limit charge and discharge electric power even in the case where it takes a long period until the work resumes.

In the embodiment, since determination whether the high-limit operation state or the low-limit operation state is performed based on the operation states of the respective levers 31 to 33, it is possible to determine the operation state without providing a new device (a device different from the respective levers 31 to 33 essentially included in the shovel 1) to the shovel 1.

The charge and discharge control unit 41 stores in advance the highest voltage V_max and the lowest voltage V_min of the terminal-to-terminal voltage of the electric storage device 11 and sets the upper-limit charge and discharge electric power so that the terminal-to-terminal voltage of the electric storage device 11 is not larger than the highest voltage V_max but not smaller than the lowest voltage V_min.

In this way, since the terminal-to-terminal voltage of the electric storage device 11 is restricted so as to be not larger than the highest voltage V_max but not smaller than the lowest voltage V_min, it is possible to suppress the deterioration of the electric storage device 11 and to secure the safety thereof.

In the embodiment, the operation state determining unit 35 detects the lever signals of the propelling lever 31, the slewing lever 32, and the displacement lever 33 to determine the operation state of the shovel 1 (see steps S1 to S7 of FIG. 4).

The operation state determining unit 35 may detect the load of an actuator (the hydraulic cylinder 20, the propelling motor 22, and the slewing motor 18) included in the shovel 1 to determine the operation state of the shovel 1.

The specific embodiment described above mainly includes inventions having the following configuration.

That is, the present invention provides a construction machine including: an electric storage device; a generator motor that has a function of operating as a motor by electric power supplied from the electric storage device and a function of operating as a generator by motive power supplied from outside; an electric power control unit that controls the delivery of electric power between the electric storage device and the generator motor; a charge and discharge control unit that outputs an instruction for controlling charge and discharge electric power of the electric storage device to the electric power control unit; a temperature measuring unit that measures temperature of the electric storage device; a charge state specifying unit that specifies a state of charge of the electric storage device; and an operation state determining unit that determines whether an operation state of the construction machine is a preset high-limit operation state or a preset low-limit operation state which is other than the high-limit operation state and set in advance as an operation state where an internal resistance of the electric storage device is maintained in a lower range than that of the high-limit operation state, in which the charge and discharge control unit sets an upper-limit charge and discharge electric power as an upper limit of the electric power during charging and discharging of the electric storage device based on the temperature of the electric storage device measured by the temperature measuring unit and the state of charge of the electric storage device specified by the charge state specifying unit, and in the case where the operation state determined by the operation state determining unit is the low-limit operation state, the charge and discharge control unit sets the upper-limit charge and discharge electric power to be larger than that in the case where the operation state determined by the operation state determining unit is the high-limit operation state.

The internal resistance of the electric storage device changes according to the temperature of the electric storage device. Therefore, as in the present invention, it is possible to limit the charging and discharging of the electric storage device according to the internal resistance of the electric storage device by setting the upper-limit charge and discharge electric power based on the temperature and the state of charge of the electric storage device.

Here, in the present invention, the upper-limit charge and discharge electric power in the case where the operation state is determined to be the low-limit operation state is set to be larger than the upper-limit charge and discharge electric power in the case where the operation state is the high-limit operation state. That is, the charge and discharge electric power in the low-limit operation state is limited less than that of the high-limit operation state.

Therefore, it is possible to suppress the charge and discharge electric power from being limited excessively in the low-limit operation state where the internal resistance of the electric storage device is maintained in a low range.

Therefore, according to the present invention, it is possible to suppress excessive limiting of the charge and discharge electric power of the electric storage device while suppressing the deterioration of the electric storage device and securing the safety thereof.

In the construction machine, it is preferable that the low-limit operation state is an operation state where continuous charge time or continuous discharge time of the electric storage device is shorter than that of the high-limit operation state.

The longer the continuous charge time and the continuous discharge time of the electric storage device, the smaller the influence of the polarization of the electric storage device, and therefore, the larger becomes the internal resistance of the electric storage device.

Therefore, by defining the low-limit operation state as in the above aspect, it is possible to reliably determine the low-limit operation state where the internal resistance is maintained in a low range.

In the construction machine, it is preferable that the construction machine further includes a self-propelling type lower propelling body; an upper slewing body provided on the lower propelling body so as to slew; and an attachment provided so as to be displaced with respect to the upper slewing body, and that the operation state determining unit determines that a working state where at least one of a slewing operation of the upper slewing body and a displacement operation of the attachment is performed is the low-limit operation state.

Since the slewing operation of the upper slewing body and the displacement operation of the attachment are highly frequently performed within a short period, it is expected that the continuous charge time and the continuous discharge time associated with these operations are relatively short.

Therefore, according to the above aspect, it is possible to determine the low-limit operation state based on a specific operation such as the displacement operation of the attachment and the slewing operation of the upper slewing body.

On the other hand, since the propelling operation of the lower propelling body is highly frequently performed for a longer period than the displacement operation of the attachment and the slewing operation of the upper slewing body, it is expected that the continuous charge time and the continuous discharge time associated with the propelling operation is relatively long.

Therefore, in the construction machine, the operation state determining unit can determine that the state where the propelling operation of the lower propelling body is performed is the high-limit operation state regardless of whether at least one of the slewing operation of the upper slewing body and the displacement operation of the attachment is performed.

Moreover, in a standby state where the displacement operation of the attachment, the slewing operation of the upper slewing body, and the propelling operation of the lower propelling body are not performed, in the case where the construction machine includes the engine that supplies motive power to the generator motor, the electric power generated by the generator motor using the motive power of the engine in the idling state is charged to the electric storage device.

Since this charging is continued until a work resumes (until the standby state is cancelled), the charging continues for a relative long period in the case where it takes time to estimate the time required for resuming the work.

Therefore, in the construction machine, it is preferable that the construction machine further includes an engine that supplies motive power to the generator motor, and that the operation state determining unit determines that a state where the generator motor operates as a generator by the motive power supplied from the engine in an idling state is the high-limit operation state.

According to this aspect, it is possible to suppress the deterioration of the electric storage device by setting a small upper-limit charge and discharge electric power even when it takes a long period until the work resumes.

In the construction machine, it is preferable that the construction machine further includes an operating lever operated to allow the construction machine to operate, and that the operation state determining unit determines whether the operation state is the high-limit operation state or the low-limit operation state based on an operation state of the operating lever.

According to the above aspect, it is possible to determine the high-limit operation state and the low-limit operation state without providing a new device to the construction machine.

In the construction machine, it is preferable that the charge and discharge control unit stores in advance a highest voltage and a lowest voltage of a terminal-to-terminal voltage of the electric storage device and sets the upper-limit charge and discharge electric power so that the terminal-to-terminal voltage of the electric storage device is not larger than the highest voltage but not smaller than the lowest voltage.

According to the above aspect, since the terminal-to-terminal voltage of the electric storage device can be controlled in a range between the highest voltage and the lowest voltage, it is possible to more reliably suppress the deterioration of the electric storage device and to secure the safety thereof.

This application is based on Japanese Patent application No. 2012-217465 filed in Japan Patent Office on Sep. 28, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising:
an electric storage device;
a generator motor that has a function of operating as a motor by electric power supplied from the electric storage device and a function of operating as a generator by motive power supplied from outside;
an electric power control unit that controls the delivery of electric power between the electric storage device and the generator motor;
a charge and discharge control unit that outputs an instruction for controlling charge and discharge electric power of the electric storage device to the electric power control unit;
a temperature measuring unit that measures temperature of the electric storage device;
a charge state specifying unit that specifies a state of charge of the electric storage device; and
an operation state determining unit that determines whether an operation state of the construction machine is a preset high-limit operation state or a preset low-limit operation state which is other than the high-limit operation state and set in advance as an operation state where an internal resistance of the electric storage device is maintained in a lower range than that of the high-limit operation state, wherein
the charge and discharge control unit sets an upper-limit charge and discharge electric power as an upper limit of the electric power during charging and discharging of the electric storage device based on the temperature of the electric storage device measured by the temperature measuring unit and the state of charge of the electric storage device specified by the charge state specifying unit, and
in a case where the operation state determined by the operation state determining unit is the low-limit operation state, the charge and discharge control unit sets the upper-limit charge and discharge electric power to be larger than that in a case where the operation state determined by the operation state determining unit is the high-limit operation state.

2. The construction machine according to claim 1, wherein the low-limit operation state is an operation state where continuous charge time or continuous discharge time of the electric storage device is shorter than that of the high-limit operation state.

3. The construction machine according to claim 2, further comprising:
a self-propelling type lower propelling body;
an upper slewing body provided on the lower propelling body so as to slew; and
an attachment provided so as to be displaced with respect to the upper slewing body, wherein
the operation state determining unit determines that a working state where at least one of a slewing operation of the upper slewing body and a displacement operation of the attachment is performed is the low-limit operation state.

4. The construction machine according to claim 3, wherein the operation state determining unit determines that a state where a propelling operation of the lower propelling body is performed is the high-limit operation state regardless of whether at least one of the slewing operation of the upper slewing body and the displacement operation of the attachment is performed.

5. The construction machine according to claim 2, further comprising:

an engine that supplies motive power to the generator motor, wherein the operation state determining unit determines that a state where the generator motor operates as a generator by the motive power supplied from the engine in an idling state is the high-limit operation state.

6. The construction machine according to claim 1, further comprising:

an operating lever operated to allow the construction machine to operate, wherein the operation state determining unit determines whether the operation state is the high-limit operation state or the low-limit operation state based on an operation state of the operating lever.

7. The construction machine according to claim 1, wherein the charge and discharge control unit stores in advance a highest voltage and a lowest voltage of a terminal-to-terminal voltage of the electric storage device and sets the upper-limit charge and discharge electric power so that the terminal-to-terminal voltage of the electric storage device is not larger than the highest voltage but not smaller than the lowest voltage.

* * * * *